United States Patent
Ketchum et al.

(10) Patent No.: US 7,742,546 B2
(45) Date of Patent: Jun. 22, 2010

(54) RECEIVER SPATIAL PROCESSING FOR EIGENMODE TRANSMISSION IN A MIMO SYSTEM

(75) Inventors: John W. Ketchum, Harvard, MA (US);
Mark S. Wallace, Bedford, MA (US); J. Rodney Walton, Carlisle, MA (US);
Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 643 days.

(21) Appl. No.: 10/682,160

(22) Filed: Oct. 8, 2003

(65) Prior Publication Data
US 2005/0078762 A1 Apr. 14, 2005

(51) Int. Cl.
*H04L 23/02* (2006.01)
*H03H 7/30* (2006.01)
*H04N 7/12* (2006.01)
*H04J 3/00* (2006.01)
*H04J 1/00* (2006.01)

(52) U.S. Cl. .................. 375/341; 375/229; 375/265; 375/262; 370/480; 370/497; 370/498; 370/529

(58) Field of Classification Search ............... 375/260, 375/267, 295, 296, 335, 346, 349, 148–149, 375/152, 136–137, 262, 265, 316, 341, 343, 375/344, 350; 370/208, 319, 210, 295, 344, 370/436; 455/63, 92, 101, 296, 702, 701, 455/703, 73, 91, 150.1
See application file for complete search history.

(56) References Cited

U.S. PATENT DOCUMENTS
3,459,679 A * 8/1969 Rosinski et al. ............... 502/65
(Continued)

FOREIGN PATENT DOCUMENTS
EP 1786118 A1 * 5/2007
(Continued)

OTHER PUBLICATIONS
Edfors et al, "An introduction to orthogonal frequency division multiplexing", Sep. 1996, pp. 1-58.*
(Continued)

*Primary Examiner*—David C Payne
*Assistant Examiner*—Linda Wong
(74) *Attorney, Agent, or Firm*—Thien T. Nguyen; Ross L. Franks

(57) ABSTRACT

For eigenmode transmission with minimum mean square error (MMSE) receiver spatial processing, a transmitter performs spatial processing on $N_S$ data symbol streams with steering vectors to transmit the streams on $N_S$ spatial channels of a MIMO channel. The steering vectors are estimates of transmitter steering vectors required to orthogonalize the spatial channels. A receiver derives a spatial filter based on an MMSE criterion and with an estimate of the MIMO channel response and the steering vectors. The receiver (1) obtains $N_R$ received symbol streams from $N_R$ receive antennas, (2) performs spatial processing on the received symbol streams with the spatial filter to obtain $N_S$ filtered symbol streams, (3) performs signal scaling on the filtered symbol streams with a scaling matrix to obtain $N_S$ recovered symbol streams, and (4) processes the $N_S$ recovered symbol streams to obtain $N_S$ decoded data streams for the $N_S$ data streams sent by the transmitter.

31 Claims, 6 Drawing Sheets

U.S. PATENT DOCUMENTS

| | | | |
|---|---|---|---|
| 6,377,631 B1 | 4/2002 | Raleigh | 375/299 |
| 6,611,231 B2 * | 8/2003 | Crilly et al. | 342/378 |
| 6,861,393 B2 * | 3/2005 | Temple et al. | 507/119 |
| 7,039,120 B1 * | 5/2006 | Thoumy et al. | 375/275 |
| 2002/0127978 A1 * | 9/2002 | Khatri | 455/103 |
| 2002/0191703 A1 * | 12/2002 | Ling et al. | 375/267 |
| 2003/0003880 A1 * | 1/2003 | Ling et al. | 455/92 |
| 2003/0108117 A1 * | 6/2003 | Ketchum et al. | 375/295 |
| 2003/0123381 A1 * | 7/2003 | Zhuang et al. | 370/208 |
| 2003/0185310 A1 * | 10/2003 | Ketchum et al. | 375/259 |
| 2004/0042556 A1 | 3/2004 | Medvedev et al. | 375/260 |
| 2004/0179627 A1 * | 9/2004 | Ketchum et al. | 375/267 |

FOREIGN PATENT DOCUMENTS

| | | |
|---|---|---|
| JP | 2002204193 | 7/2002 |
| JP | 2003209534 | 7/2003 |
| WO | WO0278211 A2 * | 10/2002 |
| WO | WO0341300 A1 * | 5/2003 |

OTHER PUBLICATIONS

Joonsuk Kim et al., "Transmission Optimization with a Space-Time Filter at Low SNR Wireless Environment," Globecom 1999, vol. 1B, Dec. 5, 1999, pp. 889-893.

Burr A.G., "Adaptive Space-Time Signal Processing and Coding," IEEE 2000, vol. 2, Oct. 22, 2000, pp. 710-714.

Hwang J-K et al., "Performance Analysis of MIMO-MMSE-DFE Multiuser Receiver for TDMA Mobile Systems with Spatial Diversity," VTC 2001 Spring. IEEE VTS $53^{rd}$. Vehicular Technology Conference. Rhodes, Greece. May 6-9, 2001, IEEE Vehicular Technology Conference, New York, NY: IEEE, US, vol. 1 of 4. Conf. 53, May 6, 2001, pp. 142-146.

International Search Report PCT/US04/032106—-International Search Authority—European Patent Office Nov. 1, 2005.

Written Opinion PCT/US04/032106-ISA-European Patent Office Apr. 8, 2006.

International Preliminary Examination Report PCT/US04/032106, IPEA US, Jan. 30, 2006.

* cited by examiner

RECEIVER SPATIAL PROCESSING FOR EIGENMODE TRANSMISSION IN A MIMO SYSTEM

BACKGROUND

I. Field

The present invention relates generally to data communication, and more specifically to techniques for performing receiver spatial processing in a multiple-input multiple-output (MIMO) communication system.

II. Background

A MIMO system employs multiple ($N_T$) transmit antennas and multiple ($N_R$) receive antennas for data transmission and is denoted as an ($N_T$, $N_R$) system. A MIMO channel formed by the $N_T$ transmit and $N_R$ receive antennas may be decomposed into $N_S$ spatial channels, where $N_S \leq \min\{N_T, N_R\}$. The $N_S$ spatial channels may be used to transmit up to $N_S$ independent data streams to achieve greater overall throughput. Spatial processing may or may not be performed by a transmitter and is performed by a receiver in order to transmit multiple data streams on the $N_S$ spatial channels.

The $N_S$ spatial channels may or may not be orthogonal to one another. Orthogonal spatial channels can only be obtained when both (1) the transmitter performs spatial processing with the proper steering vectors and (2) the receiver performs spatial processing with the proper spatial filter. The orthogonality of the spatial channels thus depends on (1) whether or not spatial processing was performed at the transmitter and (2) whether or not the spatial processing at both the transmitter and the receiver was successful in orthogonalizing the spatial channels. Each spatial channel is referred to as an "eigenmode" of the MIMO channel if the $N_S$ spatial channels are orthogonal to one another. In this case, $N_S$ data streams may be transmitted orthogonally on the $N_S$ eigenmodes. Performance is better when the spatial channels are orthogonal.

However, in a practical system, the $N_S$ spatial channels are usually not completely orthogonal to one another due to various reasons. For example, the spatial channels would not be orthogonal if (1) the transmitter has no knowledge of the MIMO channel or (2) the transmitter and/or the receiver have an imperfect estimate of the MIMO channel. If the spatial channels are not orthogonal, then each data stream will experience cross-talk from the other data streams at the receiver. The cross-talk acts as additive noise that degrades performance.

There is therefore a need in the art for techniques to mitigate the deleterious effects of cross-talk when transmitting data on multiple spatial channels in a MIMO system.

SUMMARY

Techniques for performing receiver spatial processing in a manner to mitigate cross-talk and achieve better performance are provided herein. Initially, a transmitter and/or a receiver estimates the response of a MIMO channel and decomposes the channel response estimate to obtain steering vectors, which are estimates of the transmitter steering vectors needed to orthogonalize the $N_S$ spatial channels of the MIMO channel. The transmitter is provided with the steering vectors if they are derived by the receiver. The transmitter processes (e.g., encodes, interleaves, and modulates) $N_S$ data streams to obtain $N_S$ data symbol streams for transmission on the $N_S$ spatial channels. The transmitter performs spatial processing on the $N_S$ data symbol streams with the steering vectors to obtain $N_T$ transmit symbol streams. The transmitter then conditions and transmits the $N_T$ transmit symbol streams from the $N_T$ transmit antennas to the receiver.

The receiver derives a spatial filter based on a minimum mean square error (MMSE) criterion and with the channel response estimate and the steering vectors. The receiver also derives a scaling matrix. The receiver obtains $N_R$ received symbol streams from $N_R$ receive antennas for the $N_S$ data symbol streams transmitted on the $N_S$ spatial channels. The receiver performs spatial processing on the $N_R$ received symbol streams with the spatial filter and obtains $N_S$ filtered symbol streams. The receiver further performs signal scaling on the filtered symbol streams with the scaling matrix to obtain $N_S$ recovered symbol streams, which are estimates of the $N_S$ data symbol streams sent by the transmitter. The receiver then processes (e.g., demodulates, deinterleaves, and decodes) the $N_S$ recovered symbol streams to obtain $N_S$ decoded data streams, which are estimates of the $N_S$ data streams sent by the transmitter.

The receiver spatial processing techniques described herein may be used for single-carrier and multi-carrier MIMO systems. For a multi-carrier MIMO system, the spatial processing at the transmitter and receiver may be performed for each of multiple subbands.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Figure 1:
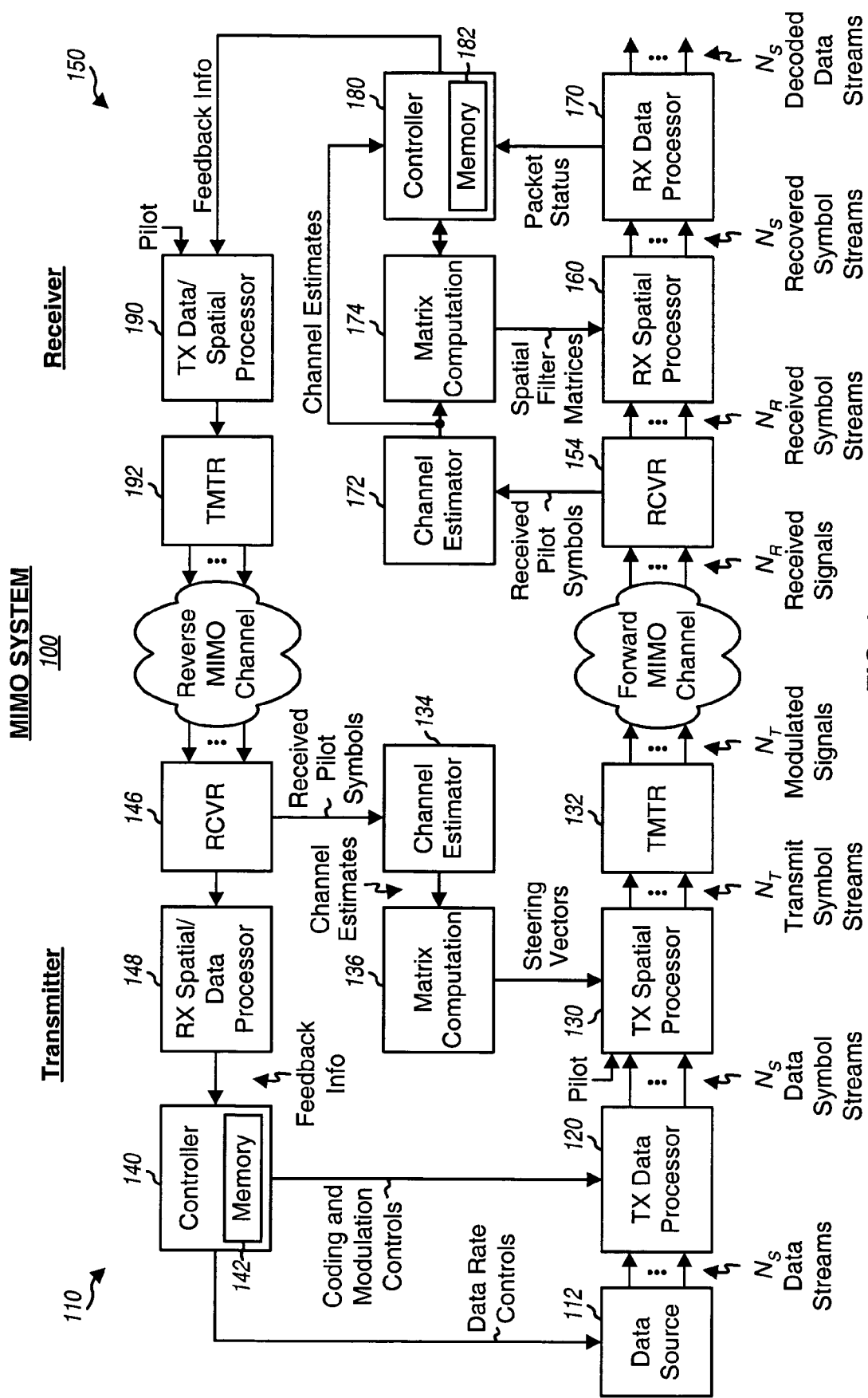
FIG. 1 shows a transmitter and a receiver in a MIMO system.

The word "exemplary" is used herein to mean "serving as an example, instance, or illustration." Any embodiment or design described herein as "exemplary" is not necessarily to be construed as preferred or advantageous over other embodiments or designs.

The receiver spatial processing techniques described herein may be used in a single-carrier MIMO system as well as a multi-carrier MIMO system. Multiple carriers may be provided by orthogonal frequency division multiplexing (OFDM), other multi-carrier modulation techniques, or some other constructs. OFDM effectively partitions the overall system bandwidth into multiple ($N_F$) orthogonal subbands, which are also commonly referred to as tones, bins, or frequency channels. With OFDM, each subband is associated with a respective carrier that may be modulated with data. For clarity, the receiver spatial processing techniques are specifically described below for a MIMO system that implements OFDM (i.e., a MIMO-OFDM system).

A frequency-selective MIMO channel with $N_T$ transmit antennas and $N_R$ receive antennas may be characterized by $N_F$ frequency-domain channel response matrices H(k), for k=1 ... $N_F$, each with dimensions of $N_R \times N_T$. These channel response matrices may be expressed as:

$$H(k) = \begin{bmatrix} h_{1,1}(k) & h_{1,2}(k) & \cdots & h_{1,N_T}(k) \\ h_{2,1}(k) & h_{2,2}(k) & \cdots & h_{2,N_T}(k) \\ \vdots & \vdots & \ddots & \vdots \\ h_{N_R,1}(k) & h_{N_R,2}(k) & \cdots & h_{N_R,N_T}(k) \end{bmatrix}, \quad \text{Eq (1)}$$

for k = 1 ... $N_F$, where entry $h_{i,j}(k)$, for i=1 ... $N_R$, j=1 ... $N_T$, and k=1 ... $N_F$, is the coupling (i.e., complex gain) between transmit antenna j and receive antenna i for subband k.

The channel response matrix H(k) for each subband may be "diagonalized" to obtain the $N_S$ eigenmodes for that subband. This diagonalization may be achieved by performing either singular value decomposition of the channel response matrix H(k) or eigenvalue decomposition of the correlation matrix of H(k), which is $R(k)=H^H(k)H(k)$.

The singular value decomposition of the channel response matrix H(k) may be expressed as:

$$H(k)=U(k)\Sigma(k)V^H(k), \text{ for k=1 ... } N_F, \quad \text{Eq (2)}$$

where U(k) is a ($N_R \times N_R$) unitary matrix of left eigenvectors of H(k);

$\Sigma(k)$ is an ($N_R \times N_T$) diagonal matrix of singular values of H(k); and V(k) is a ($N_T \times N_T$) unitary matrix of right eigenvectors of H(k).

A unitary matrix M is characterized by the property $M^H M=I$, where I is the identity matrix. The columns of a unitary matrix are orthogonal to one another.

The eigenvalue decomposition of the correlation matrix of H(k) may be expressed as:

$$R(k)=H^H(k)H(k)=V(k)\Lambda(k)V^H(k), \text{ for k=1 ... } N_F, \quad \text{Eq (3)}$$

where $\Lambda(k)$ is a ($N_R \times N_T$) diagonal matrix of eigenvalues of R(k). As shown in equations (2) and (3), the columns of V(k) are eigenvectors of R(k) as well as right eigenvectors of H(k).

Singular value decomposition and eigenvalue decomposition are described by Gilbert Strang in a book entitled "Linear Algebra and Its Applications," Second Edition, Academic Press, 1980. The receiver spatial processing techniques described herein may be used in conjunction with either singular value decomposition or eigenvalue decomposition. For clarity, singular value decomposition is used for the following description.

The right eigenvectors of H(k) are also referred to as "steering" vectors and may be used for spatial processing by a transmitter in order to transmit data on the $N_S$ eigenmodes of H(k). The left eigenvectors of H(k) may be used for spatial processing by a receiver in order to recover the data transmitted on the $N_S$ eigenmodes. The diagonal matrix $\Sigma(k)$ contains non-negative real values along the diagonal and zeros everywhere else. These diagonal entries are referred to as the singular values of H(k) and represent the channel gains for the $N_S$ eigenmodes of H(k). Singular value decomposition may be performed independently on the channel response matrix H(k) for each of the $N_F$ subbands to determine the $N_S$ eigenmodes for that subband.

Eigenmode transmission refers to transmission of data on the $N_S$ eigenmodes of the MIMO channel. Eigenmode transmission requires spatial processing by both the transmitter and the receiver, as described below.

The spatial processing at the transmitter for eigenmode transmission on subband k may be expressed as:

$$x_{ideal}(k)=V(k)s(k), \quad \text{Eq (4)}$$

where s(k) is an ($N_T \times 1$) data vector with $N_S$ non-zero entries for $N_S$ modulation symbols to be transmitted on the $N_S$ eigenmodes for subband k; and $x_{ideal}(k)$ is a ($N_T \times 1$) transmit vector with $N_T$ entries for $N_T$ transmit symbols to be sent from the $N_T$ transmit antennas for subband k.

$N_S$ entries of s(k) can represent $N_S$ data streams and the remaining entries of s(k), if any, are filled with zeros.

The received symbols obtained by the receiver for subband k may be expressed as:

$$r_{ideal}(k)=H(k)x_{ideal}(k)+n(k)=H(k)V(k)s(k)+n(k), \quad \text{Eq (5)}$$

where $r_{ideal}(k)$ is an ($N_R \times 1$) received vector with $N_R$ entries for $N_R$ received symbols obtained via the $N_R$ receive antennas for subband k; and n(k) is a noise vector for subband k.

The spatial processing or matched filtering at the receiver to recover the data vector s(k) may be expressed as:

$$\begin{aligned} \hat{s}_{ideal}(k) &= \Lambda^{-1}(k)V^H(k)H^H(k)r_{ideal}(k), \\ &= \Lambda^{-1}(k)V^H(k)H^H(k)(H(k)V(k)s(k)+n(k)), \\ &= s(k)+\tilde{n}_{ideal}(k), \end{aligned} \quad \text{Eq (6)}$$

where $\hat{s}_{ideal}(k)$ is an ($N_T \times 1$) estimated data vector with up to $N_S$ recovered data symbols for subband k; and $\tilde{n}_{ideal}(k)$ is a vector of post-processed noise for subband k.

The matched filter used by the receiver for subband k may be expressed as:

$$M_{ideal}(k)=V^H(k)H^H(k). \quad \text{Eq (7)}$$

The multiplication by $\Lambda^{-1}(k)$ in equation (6) accounts for the (possibly different) gains of the $N_S$ spatial channels and normalizes the output of the matched filter so that recovered data symbols with the proper magnitude are provided to the subsequent processing unit. The normalization (i.e., signal scaling) is based on the following observation:

$$V^H(k)H^H(k)H(k)V(k)=\Sigma^H(k)\Sigma(k)=\Lambda(k). \quad \text{Eq (8)}$$

Equation (8) indicates that the eigenvalues of $H^H(k)H(k)$ in the diagonal matrix $\Lambda(k)$ are also the squares of the singular values of H(k) in the diagonal matrix $\Sigma(k)$.

Equation (6) indicates that the $N_S$ data symbol streams s(k), distorted only by post-processed channel noise $\tilde{n}_{ideal}(k)$, may be obtained with the proper spatial processing at both the transmitter and the receiver. However, the result shown in equation (6) is ideal in that both the transmitter and the receiver are assumed to have perfect information about the MIMO channel. In a practical system, both the transmitter and the receiver will have noisy estimates of the MIMO channel and/or noisy estimates of the eigenvectors and eigenvalues. In this case, the recovered data symbols for each stream will be corrupted by cross-talk from the other streams.

The spatial processing at the transmitter in a practical system for subband k may be expressed as:

$$x(k)=\hat{V}(k)s(k), \quad \text{Eq (9)}$$

where $\hat{V}(k)$ is a matrix of steering vectors used by the transmitter for subband k; and x(k) is a transmit vector obtained with $\hat{V}(k)$.

The matrix $\hat{V}(k)$ is an estimate of V(k) and may be obtained, for example, by performing singular value decomposition of $\hat{H}(k)$, which is an estimate of H(k).

The received symbols obtained by the receiver for subband k may be expressed as:

$$r(k)=H(k)\hat{V}(k)s(k)+n(k). \quad \text{Eq (10)}$$

The matched filter M(k) for the received symbols may be expressed as:

$$M(k)=\hat{V}^H(k)H^H(k). \quad \text{Eq (11)}$$

Similar to the transmitter, the receiver in the practical system only has an estimate of this matched filter.

The spatial processing at the receiver in the practical system for subband k may be expressed as:

$$\hat{s}_{prac}(k) = \hat{\Lambda}^{-1}(k)\hat{M}(k)r(k), \quad \text{Eq (12)}$$
$$= \hat{\Lambda}^{-1}(k)\hat{M}(k)H(k)\hat{V}(k)s(k) + \tilde{n}_{prac}(k),$$
$$= s(k) + c(k) + \tilde{n}_{prac}(k),$$

where $\hat{M}(k)$ is an estimate of M(k) for subband k;

$\hat{\Lambda}(k)=\text{diag}[\hat{M}(k)H(k)\hat{V}(k)]$ for subband k; and c(k) is a vector of cross-talk terms for subband k.

In equation (12), $\hat{\Lambda}(k)$ is a diagonal matrix whose diagonal elements are the diagonal elements of $\hat{M}(k)H(k)\hat{V}(k)$. The cross-talk terms in c(k) are generated by the off-diagonal terms of $\hat{M}(k)H(k)\hat{V}(k)$, which result from (1) the use of an imperfect estimate of V(k) by the transmitter and (2) the use of an imperfect estimate of M(k) by the receiver. The cross-talk terms act as additive noise that degrades the quality of the estimated data vector $\hat{s}_{prac}(k)$.

The power in the cross-talk vector c(k) may be small relative to the signal power in the data vector s(k) if the transmitter has a good estimate of V(k) and the receiver has a good estimate of M(k), both of which require a good estimate of H(k). Good estimates of both V(k) and M(k) are needed to orthogonalize the $N_S$ spatial channels and to minimize degradation due to cross-talk. If the transmitter has a good estimate of V(k), then a good estimate of M(k) is needed to minimize the off-diagonal terms of $\hat{M}(k)H(k)\hat{V}(k)$. However, if the transmitter has a poor estimate of V(k), then the cross-talk terms may have significant amounts of power even if the receiver has a perfect estimate of M(k).

The receiver can use MMSE spatial processing to suppress the cross-talk terms and maximize the signal-to-noise-and-interference ratio (SNR) of the estimated data vector. The MMSE receiver spatial processing can provide improved performance when the transmitter has an imperfect estimate of V(k). An MMSE receiver utilizes a spatial filter having a response of W(k), which is derived such that the mean square error between the estimated data vector from the spatial filter and the data vector s(k) is minimized. This MMSE criterion may be expressed as:

$$\min_{\{W(k)\}} E[(W(k)r(k)-s(k))^{-H}(W(k)r(k)-s(k))], \quad \text{Eq (13)}$$

where E[x] is the expected value of x.

The solution to the optimization problem posed in equation (13) may be obtained in various manners. One exemplary method for deriving the MMSE spatial filter matrix W(k) is described below. For this method, the matrix W(k) may be expressed as:

$$W(k)=\hat{V}^H(k)H^H(k)[H(k)\hat{V}(k)\hat{V}^H(k)H^H(k)+\phi_{nn}(k)]^{-1}, \quad \text{Eq (14)}$$

where $\phi_{nn}(k)$ is an autocovariance matrix of the receive noise process for subband k, which is $\phi_{nn}(k)=E[n(k)n^H(k)]$.

The spatial processing by the MMSE receiver for subband k may then be expressed as:

$$\hat{s}(k) = D_Q^{-1}(k)W(k)r(k), \quad \text{Eq (15)}$$
$$= D_Q^{-1}(k)W(k)H(k)\hat{V}(k)s(k) + \tilde{n}(k),$$
$$= D_Q^{-1}(k)Q(k)s(k) + \tilde{n}(k),$$

where $\tilde{n}(k) = D_Q^{-1}(k)W(k)n(k)$, $$Q(k) = W(k)H(k)\hat{V}(k), \quad \text{Eq (16)}$$
$$= \hat{V}^H(k)H^H(k)\left[H(k)\hat{V}(k)\hat{V}^H(k)H^H(k) + \varphi_{nn}(k)\right]^{-1} H(k)\hat{V}(k),$$
$$= \hat{V}^H(k)H^H(k)[H(k)H^H(k) + \varphi_{nn}(k)]^{-1} H(k)\hat{V}(k),$$

and $D_Q(k) = \text{diag}\left[W(k)H(k)\hat{V}(k)\right]. \quad \text{Eq (17)}$ $D_Q(k)$ is a diagonal matrix whose diagonal elements are the diagonal elements of Q(k). Using the matrix inverse identity, equation (16) can be rewritten as:

$$Q(k)=\hat{V}^H(k)H^H(k)\phi_{nn}^{-1}(k)H(k)\hat{V}(k)[$$
$$\hat{V}^H(k)H^H(k)\phi_{nn}^{-1}(k)H(k)\hat{V}(k)+I]^{-1}. \quad \text{Eq (18)}$$

If the noise vector n(k) is additive white Gaussian noise (AWGN) with zero mean and an autocovariance matrix of $\phi_{nn}(k)=\sigma^2 I$, where $\sigma^2$ is the variance of the noise, then equations (14) and (18) may be simplified as:

$$W(k)=\hat{V}^H(k)H^H(k)[H(k)\hat{V}(k)\hat{V}^H(k)H^H(k)+\sigma^2 I]^{-1}, \text{ and} \quad \text{Eq (19)}$$

$$Q(k)=\hat{V}^H(k)H^H(k)H(k)\hat{V}(k)[\hat{V}^H(k)H^H(k)H(k)\hat{V}(k)+\sigma^2 I]^{-1}.$$

The MMSE receiver spatial processing in equation (15) is composed of two steps. In the first step, the vector r(k) for the $N_R$ received symbol streams is multiplied with the MMSE spatial filter matrix W(k) to obtain a vector $\tilde{s}(k)$ for $N_S$ filtered symbol streams, as follows:

$$\tilde{s}(k)=W(k)r(k). \quad \text{Eq (20)}$$

The $N_S$ filtered symbol streams are unnormalized estimates of the $N_S$ data symbol streams. In the second step, the vector $\tilde{s}(k)$ is multiplied with the scaling matrix $D_Q^{-1}(k)$ to obtain the vector $\hat{s}(k)$ for the $N_S$ recovered symbol streams, as follows:

$$\hat{s}(k)=D_Q^{-1}(k)\tilde{s}(k). \quad \text{Eq (21)}$$

The $N_S$ recovered symbol streams are normalized estimates of the $N_S$ data symbol streams.

As noted above, the receiver spatial processing techniques described herein may also be used for a single-carrier MIMO system. In this case, the description above applies, albeit without the subband index k. The spatial processing at the transmitter can be expressed as:

$$x = \hat{V}s. \qquad \text{Eq (22)}$$

The MMSE spatial processing at the receiver can be expressed as:

$$\hat{s} = D_Q^{-1} Wr, \qquad \text{Eq (23)}$$

or $\tilde{s} = Wr$ and $\hat{s} = D_Q^{-1}\tilde{s}$.

The MMSE spatial filter response W can be expressed as:

$$W = \hat{V}^H H^H [H\hat{V}\hat{V}^H + \phi_{nn}]^{-1}. \qquad \text{Eq (24)}$$

If the noise is AWGN with an autocovariance matrix of $\phi_{nn} = \sigma^2 I$, then the MMSE spatial filter response simplifies to:

$$W = \hat{V}^H H^H [H\hat{V}\hat{V}^H H^H + \sigma^2 I]^{-1} \qquad \text{Eq (25)}$$

The MMSE spatial filter matrices W and W(k) may also be derived using other methods. For example, these matrices may be derived using time recursive methods such as a recursive least square method, a least mean square method, and so on, which are known in the art.

FIG. 1 shows a block diagram of a transmitter 110 and a receiver 150 in a MIMO system 100. At transmitter 110, a TX data processor 120 receives $N_S$ data streams from a data source 112. TX data processor 120 processes (e.g., encodes, interleaves, and modulates) each data stream in accordance with a rate selected for that data stream to obtain a corresponding data symbol stream. The selected rate for each data stream may indicate the data rate, coding scheme or code rate, modulation scheme, and so on, to use for that data stream, all of which are indicated by the various controls provided by a controller 140. A TX spatial processor 130 receives $N_S$ data symbol streams from TX data processor 120, performs spatial processing on these streams with the matrices $\hat{V}(k)$, for k=1 ... $N_F$, multiplexes in pilot symbols, and provides $N_T$ transmit symbol streams to a transmitter unit (TMTR) 132. The pilot symbols are modulation symbols known a priori and may be used by receiver 150 for channel estimation.

Transmitter unit 132 performs OFDM modulation on the $N_T$ transmit symbol streams to obtain $N_T$ OFDM symbol streams. Transmitter unit 132 further conditions (e.g., converts to analog, frequency upconverts, filters, and amplifies) the OFDM symbol streams to obtain $N_T$ modulated signals. Each modulated signal is transmitted from a respective transmit antenna (not shown in FIG. 1) and via a forward MIMO channel to receiver 150. The MIMO channel distorts the $N_T$ transmitted signals with the channel response H(k), for k=1 ... $N_F$, and further degrades the transmitted signals with noise and possibly interference from other transmitters.

At receiver 150, the $N_T$ transmitted signals are received by each of $N_R$ receive antennas (not shown in FIG. 1), and the $N_R$ received signals from the $N_R$ receive antennas are provided to a receiver unit (RCVR) 154. Receiver unit 154 conditions, digitizes, and pre-processes each receive signal to obtain a corresponding received chip stream. Receiver unit 154 further performs OFDM demodulation on each received chip stream to obtain a corresponding received symbol stream. Receiver unit 154 provides $N_R$ received symbol streams (for data) to an RX spatial processor 160 and received pilot symbols (for pilot) to a channel estimator 172.

RX spatial processor 160 performs spatial processing on the $N_R$ received symbol streams to obtain $N_S$ recovered symbol streams, which are estimates of the $N_S$ data symbol streams sent by transmitter 110. An RX data processor 170 further processes (e.g., demodulates, deinterleaves, and decodes) the $N_S$ recovered symbol streams to obtain $N_S$ decoded data streams, which are estimates of the $N_S$ data streams sent by transmitter 110. RX data processor 170 also provides the status of each decoded packet, which indicates whether the packet is decoded correctly or in error.

Channel estimator 172 processes the received pilot symbols to obtain channel estimates for the forward MIMO channel (e.g., estimated channel response matrices $\hat{H}(k)$, for k=1 ... $N_F$, noise variance estimate, $\hat{\sigma}^2$, and so on). A matrix computation unit 174 receives the channel estimates, computes the MMSE spatial filter matrices W(k) and the scaling matrices $D_Q^{-1}(k)$, for k=1 ... $N_F$, and provides these matrices to RX spatial processor 160. Matrix computation unit 174 may also compute the matrices $\hat{V}(k)$, for k=1 ... $N_F$, of steering vectors for transmitter 110.

A controller 180 receives the channel estimates from channel estimator 172 and the packet status from RX data processor 170, selects the rates for the $N_S$ data streams, and assembles feedback information for transmitter 110. The feedback information may include the $N_S$ selected rates, acknowledgments (ACKs) and negative acknowledgments (NAKs) for the decoded packets, the matrices $\hat{V}(k)$, and so on. The feedback information and pilot symbols are processed by a TX data/spatial processor 190, conditioned by a transmitter unit 192, and transmitted via a reverse MIMO channel to transmitter 110.

At transmitter 110, the $N_R$ signals transmitted by receiver 150 are received and conditioned by a receiver unit 146 and further processed by an RX spatial/data processor 148 to obtain the feedback information sent by receiver 150. Controller 140 receives the feedback information, uses the ACKs/NAKs to control the transmission of data packets to receiver 150, and uses the $N_S$ selected rates to process new packets for the $N_S$ data streams.

Controllers 140 and 180 direct the operation at transmitter 110 and receiver 150, respectively. Memory units 142 and 182 provide storage for program codes and data used by controllers 140 and 180, respectively. Memory units 142 and 182 may be internal to controllers 140 and 180, as shown in FIG. 1, or external to these controllers. Some of the processing units shown in FIG. 1 are described in detail below.

Transmitter 110 may be an access point and receiver 150 may be a user terminal in the MIMO system, in which case the forward and reverse MIMO channels are the downlink and uplink, respectively. Alternatively, transmitter 110 may be a user terminal and receiver 150 may be an access point, in which case the forward and reverse MIMO channels are the uplink and downlink, respectively.

Figure 2:
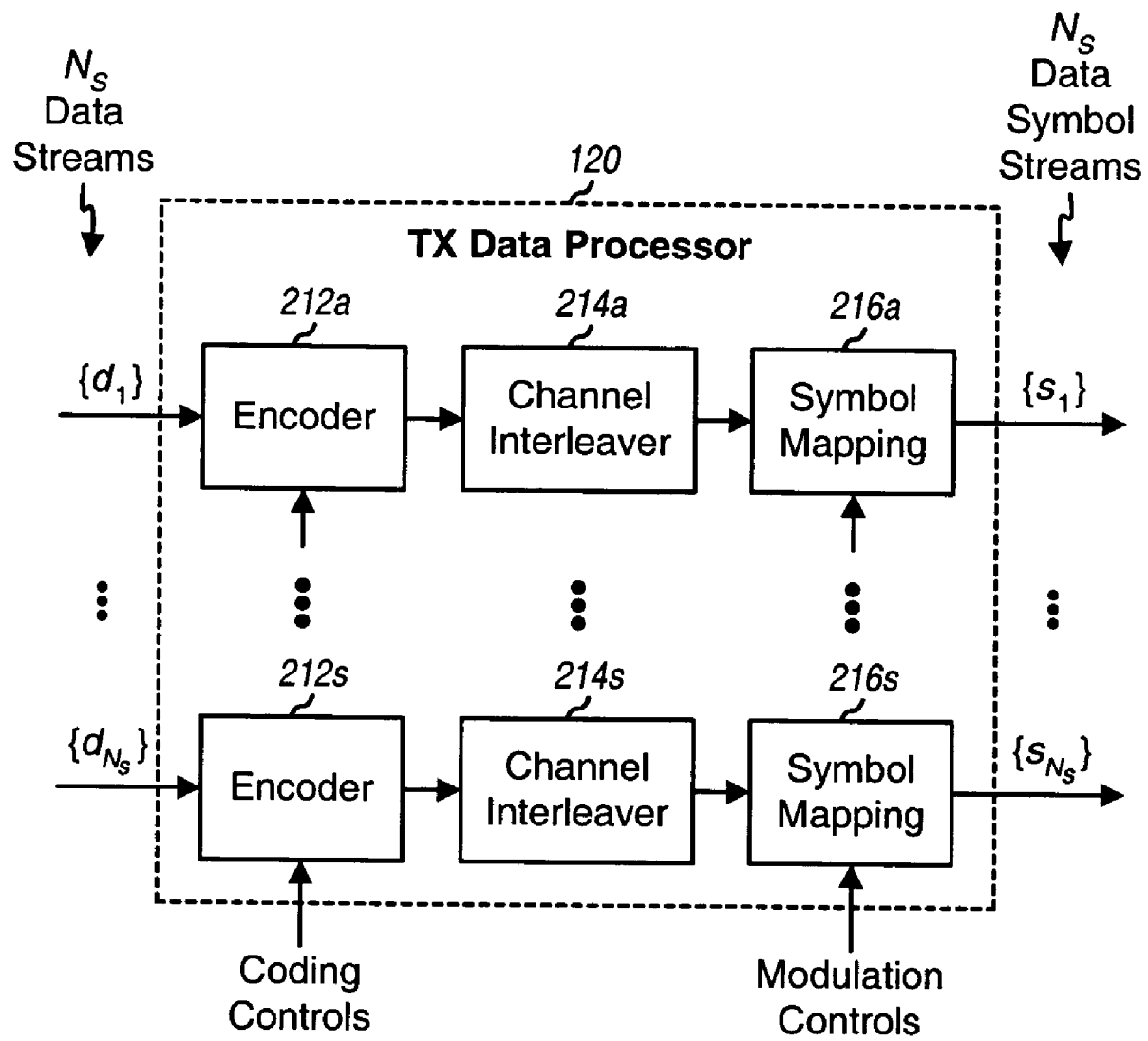
FIG. 2 shows a transmit (TX) data processor at the transmitter.

FIG. 2 shows a block diagram of an embodiment of TX data processor 120 at transmitter 110. For this embodiment, TX data processor 120 includes one set of encoder 212, channel interleaver 214, and symbol mapping unit 216 for each of the Ns data streams. For each data stream $\{d_l\}$, where l=1 ... $N_S$, an encoder 212 receives and codes the data stream based on a coding scheme indicated by the coding control and provides code bits. The data stream may carry one or more data packets, and each data packet is typically coded separately to obtain a coded data packet. The coding increases the reliability of the data transmission. The coding scheme may include cyclic redundancy check (CRC) coding, convolutional coding, Turbo coding, block coding, and so on, or a combination thereof. A channel interleaver 214 interleaves the code bits based on an interleaving scheme. The interleaving provides time, frequency, and/or spatial diversity for the code bits. A symbol mapping unit 216 maps the interleaved bits based on a modulation scheme indicated by the modulation control and provides a stream of modulation symbols $\{s_l\}$ (or simply, "data symbols"). Unit 216 groups each set of B interleaved bits to form a B-bit value, where $B \geq 1$, and further maps each B-bit value to a specific modulation symbol based on the selected modulation scheme (e.g., QPSK, M-PSK, or M-QAM, where $M = 2^B$). Each modulation symbol is a complex value in a signal constellation defined by the modulation scheme.

Figure 3:
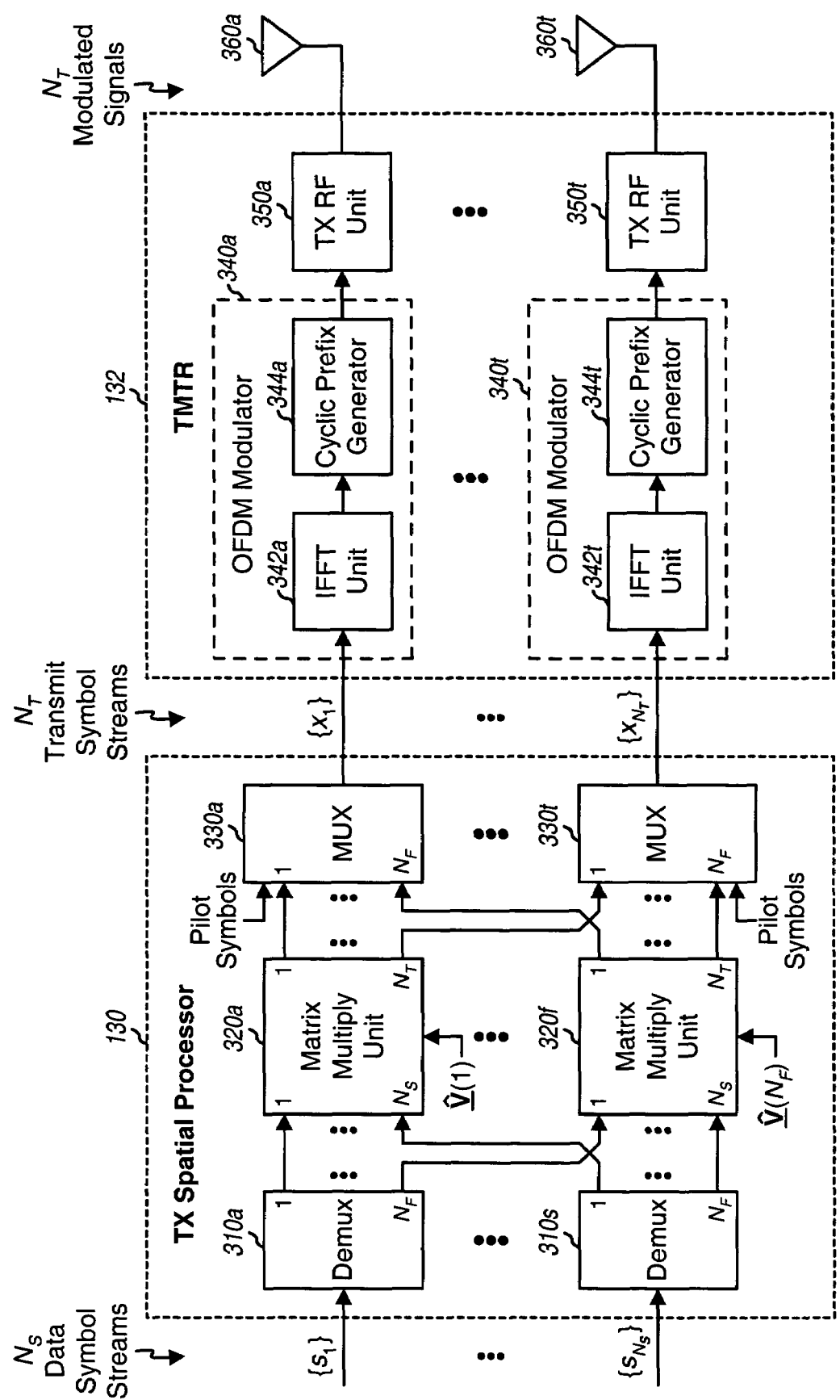
FIG. 3 shows a TX spatial processor and a transmitter unit at the transmitter.

FIG. 3 shows a block diagram of an embodiment of TX spatial processor 130 and transmitter unit 132 at transmitter 110. For simplicity, the following description assumes that all $N_F$ subbands are used for data/pilot transmission. In general, all or fewer than $N_F$ subbands may be used for data/pilot transmission. Unused subbands are filled with signal values of zero.

For the embodiment shown in FIG. 3, TX spatial processor 130 includes Ns demultiplexers (Demux) 310a through 310s for the $N_S$ data symbol streams, $N_F$ matrix multiply units 320a through 320f for the $N_F$ subbands, and $N_T$ multiplexers (MUX) 330a through 330t for the $N_T$ transmit antennas. TX spatial processor 130 receives $N_S$ data symbol streams $\{s_l\}$, for $l = 1 \ldots N_S$, from TX data processor 120. Each demultiplexer 310 receives a respective data symbol stream $\{s_l\}$, demultiplexes the stream into $N_F$ data symbol substreams for the $N_F$ subbands, and provides the $N_F$ substreams to NF matrix multiply units 320a through 320f. Each matrix multiply unit 320 receives Ns data symbol substreams for its subband from $N_S$ demultiplexers 310a through 310s, multiplies these substreams with the matrix $\hat{V}(k)$, and provides $N_T$ transmit symbol substreams for the $N_T$ transmit antennas. Each matrix multiply unit 320 performs transmit spatial processing for its subband and multiplies the data vector s(k) with the matrix $\hat{V}(k)$ to obtain the transmit vector x(k), as shown in equation (9).

Each multiplexer 330 receives $N_F$ transmit symbol substreams for its transmit antenna from $N_F$ matrix multiply units 320a through 320f, multiplexes these substreams and pilot symbols, and provides a transmit symbol stream $\{x_j\}$ for its transmit antenna. The pilot symbols may be multiplexed on some subbands and/or in some symbol periods. $N_T$ multiplexers 330a through 330t provide $N_T$ transmit symbol streams $\{x_j\}$, for $j = 1 \ldots N_T$, for the $N_T$ transmit antennas.

The pilot may be transmitted in various manners. For the embodiment shown in FIG. 3, a MIMO pilot is transmitted from all $N_T$ transmit antennas, with the pilot symbols for each transmit antenna being covered with a different orthogonal sequence (e.g., a Walsh sequence). Covering is a process whereby a given modulation symbol (or a set of L modulation symbols with the same value) to be transmitted is multiplied by all L chips of an L-chip orthogonal sequence to obtain L covered symbols, which are then transmitted. The covering for the MIMO pilot achieves orthogonality among the NT pilot transmissions from the $N_T$ transmit antennas and allows the receiver to distinguish the pilot transmission from each individual transmit antenna. The receiver can estimate the MIMO channel response H(k) based on the MIMO pilot.

In another embodiment, a steered pilot (i.e., a steered reference) is transmitted on specific spatial channels. For this embodiment, the pilot symbols are multiplexed with the data symbols prior to matrix multiply units 320 and multiplied with one column of $\hat{V}(k)$ at a time to generate the steered pilot. The receiver can estimate the spatial channels of the MIMO channel based on the steered pilot.

For the embodiment shown in FIG. 3, transmitter unit 132 includes $N_T$ OFDM modulators 340a through 340t and $N_T$ TX RF units 350a through 350t for the $N_T$ transmit antennas. Each OFDM modulator 340 includes an inverse fast Fourier transform (IFFT) unit 342 and a cyclic prefix generator 344. Each OFDM modulator 340 receives a respective transmit symbol stream $\{x_j\}$ from TX spatial processor 130 and groups each set of $N_F$ transmit symbols for the $N_F$ subbands. IFFT unit 342 transforms each set of $N_F$ transmit symbols to the time domain using an $N_F$-point inverse fast Fourier transform and provides a corresponding transformed symbol that contains $N_F$ chips. Cyclic prefix generator 344 repeats a portion of each transformed symbol to obtain a corresponding OFDM symbol that contains $N_F + N_{cp}$ chips. The repeated portion is referred to as a cyclic prefix, and $N_{cp}$ is the number of chips being repeated. The cyclic prefix ensures that the OFDM symbol retains its orthogonal properties in the presence of multipath delay spread caused by frequency selective fading (i.e., a frequency response that is not flat). Cyclic prefix generator 344 provides a stream of OFDM symbols for the stream of transmit symbols. TX RF units 350a through 350t receive and condition $N_T$ OFDM symbol streams to generate $N_T$ modulated signals, which are transmitted from $N_T$ transmit antennas 360a through 360t, respectively.

Figure 4:
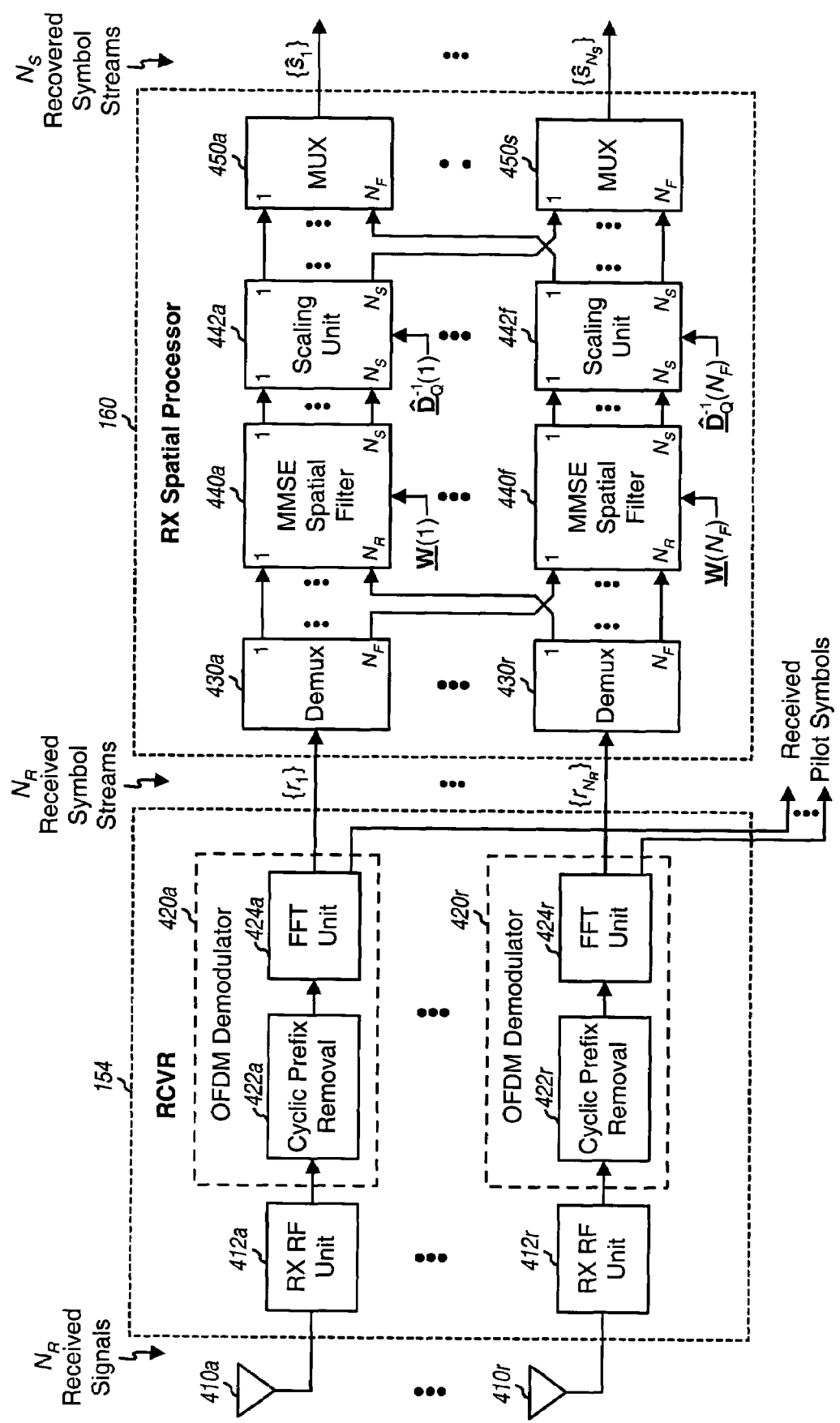
FIG. 4 shows a receiver unit and a receive (RX) spatial processor at the receiver.

FIG. 4 shows a block diagram of an embodiment of receiver unit 154 and RX spatial processor 160 at receiver 150. At receiver 150, $N_R$ receive antennas 410a through 410r receive the $N_T$ modulated signals transmitted by transmitter 110 and provide $N_R$ received signals to receiver unit 154. Receiver unit 154 includes $N_R$ RX RF units 412a through 412r and $N_R$ OFDM demodulators 420a through 420r for the $N_R$ receive antennas. Each RX RF unit 412 receives, conditions, and digitizes a respective received signal and provides a stream of chips to an associated OFDM demodulator 420, which performs OFDM demodulation on the stream of chips. Within OFDM demodulator 420, a cyclic prefix removal unit 422 removes the cyclic prefix in each received OFDM symbol to obtain a received transformed symbol. A fast Fourier transform (FFT) unit 424 then transforms each received transformed symbol to the frequency domain with an $N_F$-point fast Fourier transform to obtain $N_F$ received symbols for the $N_F$ subbands. OFDM demodulator 420 provides a stream of received symbols to RX spatial processor 160 and received pilot symbols to channel estimator 172 (not shown in FIG. 4).

For the embodiment shown in FIG. 4, RX spatial processor 160 includes $N_R$ demultiplexers 430a through 430r for the $N_R$ receive antennas, $N_F$ MMSE spatial filters 440a through 440f and $N_F$ scaling units 442a through 442f for the $N_F$ subbands, and $N_S$ multiplexers 450a through 450s for the $N_S$ data streams. RX spatial processor 160 receives $N_R$ received symbol streams $\{r_i\}$, for $i = 1 \ldots N_R$, from receiver unit 154. Each demultiplexer 430 receives a respective received symbol stream $\{r_i\}$, demultiplexes the stream into $N_F$ received symbol substreams for the $N_F$ subbands, and provides the $N_F$ substreams to $N_F$ spatial filters 440a through 440f. Each spatial filter 440 receives $N_R$ received symbol substreams for its subband from $N_R$ demultiplexers 430a through 430r, performs spatial processing on these substreams with the spatial filter matrix W(k), and provides $N_S$ filtered symbol substreams for its subband. Each spatial filter 440 performs MMSE receiver spatial processing for its subband and multiplies the received vector r(k) with the spatial filter matrix W(k), as shown in equation (15).

Each scaling unit 442 receives $N_S$ filtered symbol substreams for its subband from an associated spatial filter 440, scales these substreams with the diagonal matrix $D_Q^{-1}(k)$, and provides $N_S$ recovered symbol substreams ŝ(k) for its subband. Each scaling unit 442 performs the signal scaling for its subband, as also shown in equation (15). Each multiplexer 450 receives and multiplexes $N_F$ recovered symbol substreams for its data stream from $N_F$ scaling units 442a through 442f and provides a recovered symbol stream. $N_S$ multiplexers 450a through 450s provide $N_S$ recovered symbol streams $\{\hat{s}_l\}$, for l=1 ... $N_S$, for the $N_S$ data streams.

Figure 5:
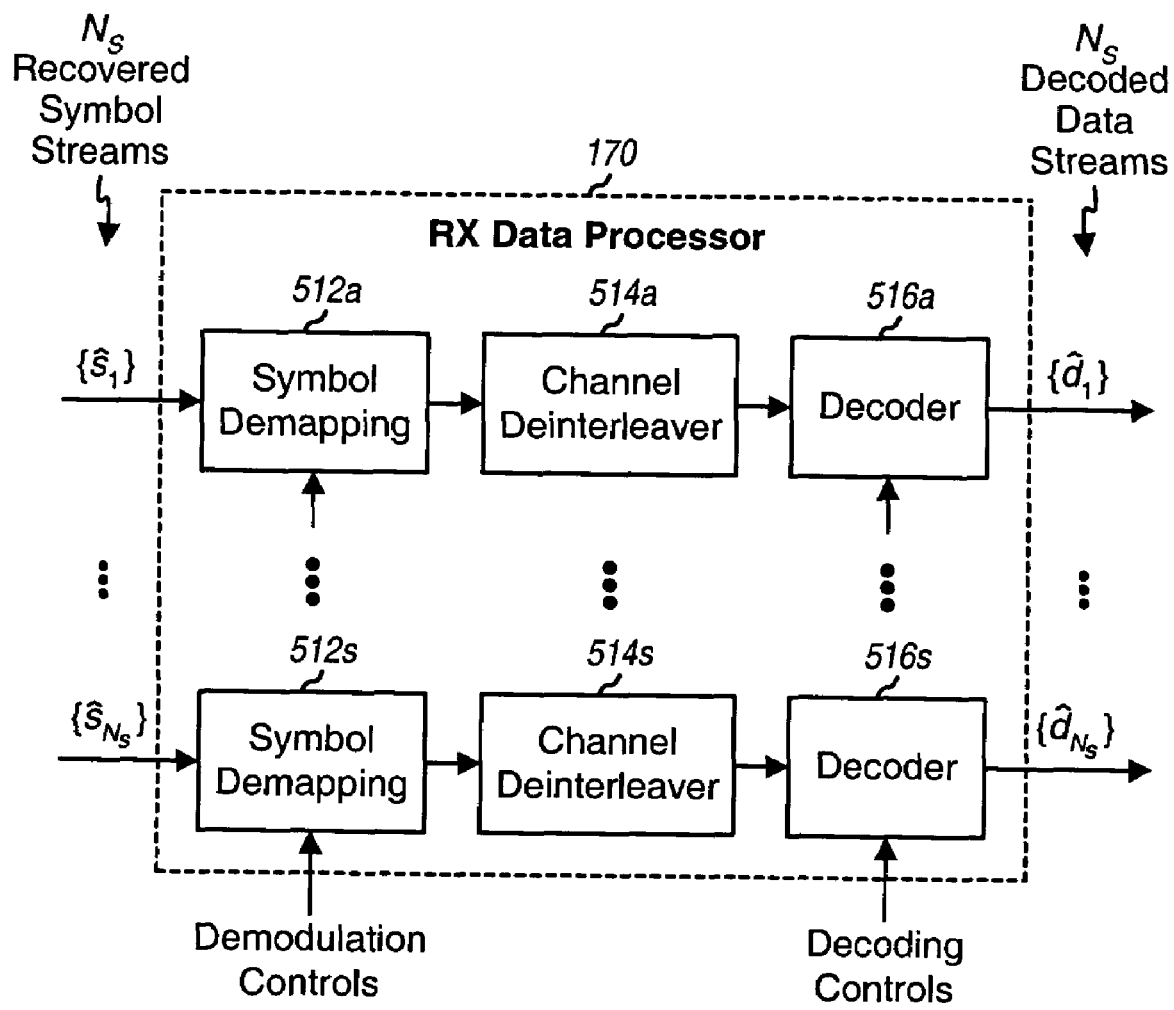
FIG. 5 shows an RX data processor at the receiver.

FIG. 5 shows a block diagram of an embodiment of RX data processor 170 at receiver 150. RX data processor 170 includes one set of symbol demapping unit 512, channel deinterleaver 514, and decoder 516 for each of the $N_S$ data streams. For each recovered symbol stream $\{\hat{s}_l\}$, where l = 1 ... $N_S$, a symbol demapping unit 512 demodulates the recovered symbols in accordance with the modulation scheme used for that stream (as indicated by a demodulation control from controller 180) and provides demodulated data to an associated channel deinterleaver 514. Channel deinterleaver 514 deinterleaves the demodulated data in a manner complementary to the interleaving performed at the transmitter for that stream and provides deinterleaved data to an associated decoder 516. Decoder 516 decodes the deinterleaved data in a manner complementary to the encoding performed at the transmitter, as indicated by a decoding control from controller 180. For example, a Turbo decoder or a Viterbi decoder may be used for decoder 516 if Turbo or convolutional coding, respectively, is performed at the transmitter. Decoder 516 provides a decoded packet for each received data packet. Decoder 516 further checks each decoded packet to determine whether the packet is decoded correctly or in error and provides the status of the decoded packet.

Referring back to FIG. 1, channel estimator 172 obtains from receiver unit 154 the received pilot symbols for the $N_R$ receive antennas. If the pilot symbols for each transmit antenna are covered with a different orthogonal sequence, then channel estimator 172 "decovers" the received pilot symbols for each receive antenna i with the NT orthogonal sequences used by transmitter 110 for the $N_T$ transmit antennas to obtain estimates of the complex channel gain between receive antenna i and each of the $N_T$ transmit antennas. Decovering (which is complementary to covering) is a process whereby received (pilot) symbols are multiplied by the L chips of the L-chip orthogonal sequence to obtain L decovered symbols, which are then accumulated to obtain an estimate of the transmitted (pilot) symbol. If pilot symbols are transmitted on only a subset of the $N_F$ subbands, then channel estimator 172 can perform interpolation on the channel response estimates for subbands with pilot transmission to obtain channel response estimates for subbands without pilot transmission. In any case, channel estimator 172 provides the estimated channel response matrices $\hat{H}(k)$, for k=1 ... $N_F$ and the noise variance estimate, $\hat{\sigma}^2$, to matrix computation unit 174.

Matrix computation unit 174 receives the channel estimates and computes the MMSE spatial filter matrices W(k), for k=1 ... $N_F$. For each subband k, matrix computation unit 174 may first perform singular value decomposition of $\hat{H}(k)$ to obtain $\hat{V}(k)$, and then use $\hat{V}(k)$, $\hat{H}(k)$, and $\hat{\sigma}^2$ to obtain W(k), as shown in equation set (19). Matrix computation unit 174 may compute the diagonal matrices $D_Q(k)$, for k=1 ... $N_F$ based on W(k), $\hat{H}(k)$, and $\hat{V}(k)$, as shown in equation (17), or using some other technique. Matrix computation unit 174 provides (1) the spatial filter matrices W(k), for k=1 ... $N_F$, to spatial filters 440a through 440f within RX spatial processor 160 and (2) the scaling matrices $D_Q^{-1}(k)$, for k=1 ... $N_F$, to scaling units 442a through 442f.

Figure 6:
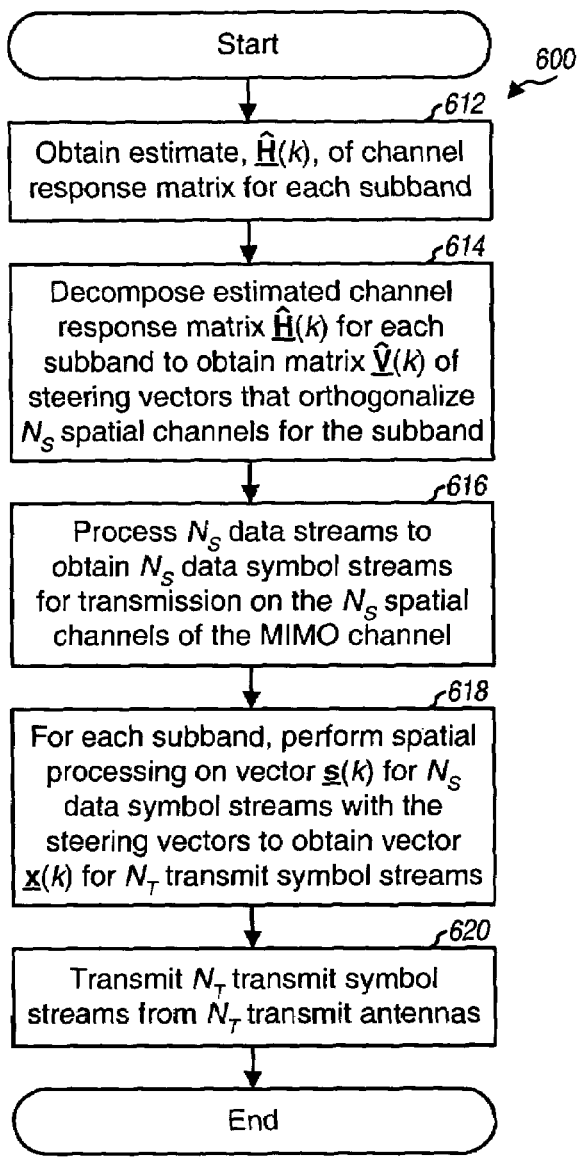
FIGS. 6 and 7 show processes performed by the transmitter and the receiver, respectively, for eigenmode transmission with MMSE receiver spatial processing.

FIG. 6 shows a flow diagram of a process 600 performed by transmitter 110 for eigenmode transmission with MMSE receiver spatial processing. Initially, an estimate, $\hat{H}(k)$, of the channel response matrix for each subband is obtained (step 612). The estimated channel response matrix $\hat{H}(k)$ for each subband is then decomposed (e.g., using singular value decomposition) to obtain the matrix $\hat{V}(k)$ of steering vectors, which are estimates of the matrix V(k) of steering vectors needed to orthogonalize the $N_S$ spatial channels (step 614). Steps 612 and 614 may be performed by the transmitter, the receiver, or both.

The transmitter processes $N_S$ data streams to obtain $N_S$ data symbol streams for transmission on the $N_S$ spatial channels (step 616). For each subband, the transmitter performs spatial processing on the vector s(k) for the $N_S$ data symbol streams with the matrix $\hat{V}(k)$ of steering vectors to obtain the vector x(k) for the $N_T$ transmit symbol streams, as shown in equation (9) (step 618). The transmitter then transmits the $N_T$ transmit symbol streams from the $N_T$ transmit antennas to the receiver (step 620).

Figure 7:
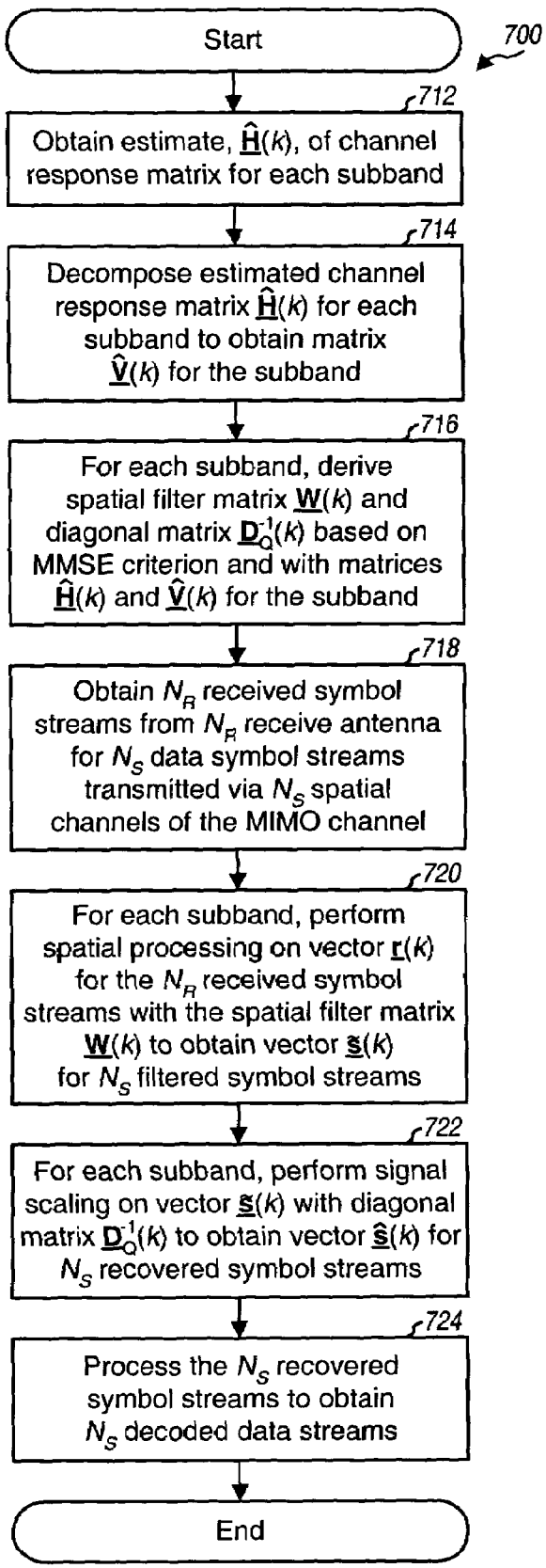

FIG. 7 shows a flow diagram of a process 700 performed by the receiver for eigenmode transmission with MMSE receiver spatial processing. Initially, the estimated channel response matrix $\hat{H}(k)$ is obtained for each subband (step 712) and decomposed to obtain the matrix $\hat{V}(k)$ for the subband (step 714). The spatial filter matrix W(k) for each subband is then derived based on the MMSE criterion and with the matrices $\hat{H}(k)$ and $\hat{V}(k)$ for the subband, as shown in equation set (19) (step 716). The MMSE spatial filter response comprises the MMSE spatial filter matrices for all $N_F$ subbands, i.e., W(k), for k=1 ... $N_F$. The scaling matrix $D_Q^{-1}(k)$ for each subband is also derived in step 716.

The receiver obtains $N_R$ received symbol streams from $N_R$ receive antennas for the $N_S$ data symbol streams transmitted on the $N_S$ spatial channels (step 718). For each subband, the receiver performs spatial processing on the vector r(k) for the $N_R$ received symbol streams with the spatial filter matrix W(k) to obtain the vector $\tilde{s}(k)$ for $N_S$ filtered symbol streams, as shown in equation (20) (step 720). For each subband, the receiver also performs signal scaling on the vector $\tilde{s}(k)$ with the scaling matrix $D_Q^{-1}(k)$ to obtain the vector $\hat{s}(k)$ for the $N_S$ recovered symbol streams, as shown in equation (21) (step 722). The receiver further processes the $N_S$ recovered symbol streams to obtain $N_S$ decoded data streams (step 724).

The receiver spatial processing techniques described herein may be used for a time division duplex (TDD) system as well as a frequency division duplex (FDD) system. The derivation of the matrices $\hat{V}(k)$ of steering vectors for the transmitter and the spatial filter matrices W(k) for the receiver is dependent on the system type (e.g., TDD or FDD) and the pilot type (e.g., MIMO or steered pilot).

For an FDD system, the forward MIMO channel (the first link of the MIMO channel) and the reverse MIMO channel (the second link of the MIMO channel) use different frequency bands and are likely to observe different fading and multipath effects. In this case, receiver 150 may compute the matrices $\hat{V}(k)$, for k=1 ... $N_F$, based on the estimated channel response matrices $\hat{H}(k)$, for k=1 ... $N_F$, for the forward MIMO channel and send the matrices V(k) as part of the feedback information to transmitter 110. Alternatively, receiver 150 may compute a single matrix $\hat{V}$ for all $N_F$ subbands based on $\hat{H}(k)$, for k=1 ... $N_F$, and send this matrix to transmitter 110.

For a TDD system, the forward and reverse MIMO channels share the same frequency band and are likely to observe similar fading and multipath effects. In this case, the forward and reverse MIMO channel responses may be assumed to be reciprocal of one another. That is, if H(k) represents the channel response matrix from antenna array A at transmitter 110 to antenna array B at receiver 150 for subband k, then a reciprocal channel implies that the coupling from antenna array B to antenna array A is given by $H^T(k)$. For the TDD system, calibration may be performed to determine and account for differences in the transmit and receive chains at transmitter 110 and receiver 150. A channel estimator 134 at transmitter 110 may then estimate the reverse MIMO channel responses based on pilot symbols received from receiver 150. If receiver 150 transmits a MIMO pilot, then channel estimator 134 can estimate the reverse MIMO channel response based on the MIMO pilot. A matrix computation unit 136 can then estimate the forward MIMO channel response as the transpose of the estimated reverse MIMO channel response and compute the matrices $\hat{V}(k)$, for k=1 ... $N_F$, by performing decomposition of the estimated forward MIMO channel response. If receiver 150 transmits a steered pilot on specific spatial channels, then matrix computation unit 136 can estimate the columns of matrices $\hat{V}(k)$ directly based on the steered pilot received from receiver 150. In any case, matrix computation unit 136 provides the matrices $\hat{V}(k)$ of steering vectors to TX spatial processor 130.

In one exemplary TDD MIMO system, the transmitter transmits a MIMO pilot on the downlink. The receiver estimates the downlink channel response based on the MIMO pilot, performs decomposition of the estimated downlink channel response to obtain the matrix $\hat{V}(k)$ of eigenvectors, and transmits a steered pilot on the uplink using the eigenvectors. The transmitter obtains an estimate of the uplink channel response based on the steered pilot and obtains an estimate of the matrix $\hat{V}(k)$ based on the received steered pilot. The transmitter thus has an estimate, $\hat{V}(k)$, of the receiver's estimate, $\hat{V}(k)$, of the true eigenvectors $V(k)$. However, this scheme simplifies the processing to obtain the steering vectors.

The receiver spatial processing techniques described herein may be implemented by various means. For example, these techniques may be implemented in hardware, software, or a combination thereof. For a hardware implementation, the processing units used to perform the spatial processing at each of the transmitter and receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the spatial processing at each of the transmitter and receiver may be implemented with modules (e.g., procedures, functions, and so on) that perform the functions described herein. The software codes may be stored in a memory unit (e.g., memory unit 142 or 182 in FIG. 1) and executed by a processor (e.g., controller 140 or 180). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing spatial processing at a receiver in a wireless multiple-input multiple-output (MIMO) communication system, comprising:

obtaining a plurality of received symbol streams for a plurality of data symbol streams sent via a plurality of spatial channels of a MIMO channel in the wireless MIMO communication system, wherein spatial processing is performed at a transmitter with steering vectors, which are estimates of transmitter steering vectors required to orthogonalize the plurality of spatial channels;

receiving orthogonal pilot transmissions from a plurality of antennas at the transmitter;

obtaining an estimate of a channel response matrix for the MIMO channel, wherein the estimated channel response matrix is obtained based on the received orthogonal pilot transmissions; and performing spatial processing on the plurality of received symbol streams with a spatial filter to obtain a plurality of filtered symbol streams, which are estimates of the plurality of data symbol streams, wherein the spatial filter has a response derived based on a minimum mean square error (MMSE) criterion that minimizes mean square error between the plurality of filtered symbol streams and the plurality of data symbol streams, wherein the spatial filter response is derived in accordance with the following formula:

$W = \hat{V}^H \hat{H}^H [\hat{H}\hat{V}\hat{V}^H\hat{H}^H + \emptyset_{nn}]^{-1}$, where W is the spatial filter response, $\hat{V}$ is a matrix of the steering vectors used for spatial processing at the transmitter, $\hat{H}$ is the estimated channel response matrix, $\hat{V}^H$ and $\hat{H}^H$ denote the Hermitian or conjugate transpose of $\hat{V}$ and $\hat{H}$ respectively, and $\emptyset_{nn}$ is an autocovariance matrix of noise at the receiver.

2. The method of claim 1, further comprising:

scaling the plurality of filtered symbol streams to obtain a plurality of recovered symbol streams, which are normalized estimates of the plurality of data symbol streams.

3. The method of claim 1, wherein the spatial processing is performed in accordance with the following formula:

$\hat{s} = Wr$, where $\hat{s}$ is a vector for the plurality of filter symbol streams.

4. The method of claim 1, further comprising:

receiving a steered pilot via the plurality of spatial channels; and deriving the spatial filter response based on the received steered pilot.

5. The method of claim 1, wherein the plurality of data symbol streams are spatially processed at the transmitter with a plurality of steering vectors obtained by decomposing an estimate of a channel response matrix for the MIMO channel.

6. The method of claim 1, wherein the MIMO system implements orthogonal frequency division multiplexing (OFDM), and wherein the spatial processing is performed for each of a plurality of subbands.

7. The method of claim 1, further comprising deriving the spatial filter response based on the estimated channel response matrix.

8. A receiver in a wireless multiple-input multiple-output (MIMO) communication system, comprising:

a receiver unit operative to receive orthogonal pilot transmissions from a plurality of antennas at a transmitter, the receiver unit also operative to obtain a plurality of received symbol streams for a plurality of data symbol streams sent via a plurality of spatial channels of a MIMO channel in the wireless MIMO communication system, wherein spatial processing is performed at a transmitter with steering vectors, which are estimates of transmitter steering vectors required to orthogonalize the plurality of spatial channels;

a channel estimator operative to obtain an estimate of a channel response matrix for the MIMO channel, wherein the estimated channel response matrix is obtained based on the received orthogonal pilot transmissions; and, a spatial filter operative to spatially process the plurality of received symbol streams to obtain a plurality of filtered symbol streams, which are estimates of the plurality of data symbol streams, wherein the spatial filter has a response derived based on a minimum mean square error (MMSE) criterion that minimizes mean square error between the plurality of filtered symbol streams and the plurality of data symbol streams, wherein the spatial filter response is derived in accordance with the following formula: $W=\hat{V}^H \hat{H}^H [\hat{H}\hat{V}\hat{V}^H \hat{H}^H + \varnothing_{nn}]^{-1}$, where W is the spatial filter response, $\hat{V}$ is a matrix of the steering vectors used for spatial processing at the transmitter, $\hat{H}$ if the estimated channel response matrix, $\hat{V}^H$ and $\hat{H}^H$ denote the Hermitian or conjugate transpose of $\hat{V}$ and $\hat{H}$ respectively, and $\varnothing_{nn}$ is an autocovariance matrix of noise at the receiver.

9. The receiver of claim 8, further comprising:

a scaling unit operative to scale the plurality of filtered symbol streams to obtain a plurality of recovered symbol streams, which are normalized estimates of the plurality of data symbol streams.

10. The receiver of claim 8, wherein the wireless MIMO communication system implements orthogonal frequency division multiplexing (OFDM), and wherein the spatial filter is operative to perform spatial processing for each of a plurality of subbands.

11. The receiver of claim 8, further comprising a matrix computation unit operative to derive the spatial filter response based on the estimated channel response matrix.

12. A receiver apparatus in a wireless multiple-input multiple-output (MIMO) communication system, comprising:

means for obtaining a plurality of received symbol streams for a plurality of data symbol streams sent via a plurality of spatial channels of a MIMO channel in the wireless MIMO communication system, wherein spatial processing is performed at a transmitter with steering vectors, which are estimates of transmitter steering vectors required to orthogonalize the plurality of spatial channels;

means for receiving orthogonal pilot transmissions from a plurality of antennas at the transmitter;

means for obtaining an estimate of a channel response matrix for the MIMO channel, wherein the estimated channel response matrix is obtained based on the received orthogonal pilot transmissions; and means for performing spatial processing on the plurality of received symbol streams with a spatial filter to obtain a plurality of filtered symbol streams, which are estimates of the plurality of data symbol streams, wherein the spatial filter has a response derived based on a minimum mean square error (MMSE) criterion that minimizes mean square error between the plurality of filtered symbol streams and the plurality of data symbol, wherein the spatial filter response is derived in accordance with the following formula:
$W=\hat{V}^H \hat{H}^H [\hat{H}\hat{V}\hat{V}^H \hat{H}^H + \varnothing_{nn}]^{-1}$, where W is the spatial filter response, $\hat{V}$ is a matrix of the steering vectors used for spatial processing at the transmitter, $\hat{H}$ is the estimated channel response matrix, $\hat{V}^H$ and $\hat{H}^H$ denote the Hermitian or conjugate transpose of $\hat{V}$ and $\hat{H}$ respectively, and $\varnothing_{nn}$ is an autocovariance matrix of noise at the receiver.

13. The receiver apparatus of claim 12, further comprising:

means for scaling the plurality of filtered symbol streams to obtain a plurality of recovered symbol streams, which are normalized estimates of the plurality of data symbol streams.

14. The receiver apparatus of claim 12, wherein the wireless MIMO communication system implements orthogonal frequency division multiplexing (OFDM), and wherein the spatial processing is performed for each of a plurality of subbands.

15. The receiver apparatus of claim 12, further comprising means for deriving the spatial filter response based on the estimated channel response matrix.

16. A method of performing spatial processing at a transmitter in a wireless multiple-input multiple-output (MIMO) communication system, comprising:

obtaining a plurality of data symbol streams for transmission on a plurality of spatial channels of a MIMO channel in the wireless MIMO communication system;

obtaining an estimate of a plurality of steering vectors, wherein the plurality of steering vectors is based on received orthogonal pilot transmissions; and performing spatial processing on the plurality of data symbol streams with the plurality of steering vectors, one steering vector for each data symbol stream, to obtain a plurality of transmit symbol streams for transmission from a plurality of transmit antennas, wherein the plurality of steering vectors are estimates of transmitter steering vectors required to orthogonalize the plurality of spatial channels, and wherein the plurality of data symbol streams are recovered at a receiver with a spatial filter having a response derived based on a minimum mean square error (MMSE) criterion that minimizes mean square error between a plurality of filtered symbol streams from the spatial filter and the plurality of data symbol streams, $W=\hat{V}^H \hat{H}^H [\hat{H}\hat{V}\hat{V}^H \hat{H}^H + \varnothing_{nn}]^{-1}$, where W is the spatial filter response, $\hat{V}$ is a matrix of the steering vectors used for spatial processing at the transmitter, $\hat{H}$ is the estimated channel response matrix, $\hat{V}^H$ and $\hat{H}^H$ denote the Hermitian or conjugate transpose of $\hat{V}$ and $\hat{H}$ respectively, and $\varnothing_{nn}$ is an autocovariance matrix of noise at the receiver.

17. The method of claim 16, wherein the spatial processing is performed in accordance with the following formula;
$x=\hat{V}s$, where s is a vector for the plurality of the data symbol streams, $\hat{V}$ is a matrix for the plurality of steerin vectors, and x is a cover for the plurality of transmit symbol streams.

18. The method of claim 16, wherein the plurality of steering vectors are obtained by decomposing an estimate of a channel response matrix for the MIMO channel.

19. The method of claim 16, wherein the wireless MIMO communication system is a time division duplex (TDD) system, wherein the plurality of data symbol streams are transmitted on a first link of the MIMO channel, and wherein the plurality of steering vectors are derived based on an estimate of a second link of the MIMO channel.

20. The method of claim 19, further comprising:
obtaining an estimate of a channel response matrix for the second link; and
decomposing the estimated channel response matrix for the second link to obtain the plurality of steering vectors used for the first link.

21. The method of claim 19, further comprising:
receiving a steered pilot via a plurality of spatial channels of the second link; and
deriving the plurality of steering vectors used for the first link based on the received steered pilot.

22. The method of claim 16, wherein the MIMO system implements orthogonal frequency division multiplexing (OFDM), and wherein the spatial processing is performed for each of a plurality of subbands.

23. A transmitter in a wireless multiple-input multiple-output (MIMO) communication system, comprising:
a transmit data processor operative to process a plurality of data streams and provide a plurality of data symbol streams for transmission on a plurality of spatial channels of a MIMO channel in the wireless MIMO communication system;
an estimator operative to obtain an estimate of a plurality of steering vectors, wherein the plurality of steering vectors is based on received orthogonal pilot transmissions; and
a transmit spatial processor operative to perform spatial processing on the plurality of data symbol streams with the plurality of steering vectors, one steering vector for each data symbol stream, to obtain a plurality of transmit symbol streams for transmission from a plurality of transmit antennas, wherein the plurality of steering vectors are estimates of transmitter steering vectors required to orthogonalize the plurality of spatial channels, and
wherein the plurality of data symbol streams are recovered at a receiver with a spatial filter having a response derived based on a minimum mean square error (MMSE) criterion that minimizes mean square error between a plurality of filtered symbol streams from the spatial filter and the plurality of data symbol streams, $W=\hat{V}^H\hat{H}^H[\hat{H}\hat{V}\hat{V}^H\hat{H}^H+\emptyset_{nn}]^{-1}$,
where W is the spatial filter response,
$\hat{V}$ is a matrix of the steering vectors used for spatial processing at the transmitter,
$\hat{H}$ is the estimated channel response matrix,
$\hat{V}^H$ and $\hat{H}^H$ denote the Hermitian or conjugate transpose of $\hat{V}$ and $\hat{H}$ respectively, and
$\emptyset_{nn}$ is an autocovariance matrix of noise at the receiver.

24. The transmitter of claim 23, wherein the wireless MIMO communication system is a time division duplex (TDD) system, wherein the plurality of data symbol streams are transmitted on a first link of the MIMO channel, and wherein the plurality of steering vectors are derived based on an estimate of a second link of the MIMO channel.

25. The transmitter of claim 24, further comprising:
a channel estimator operative to obtain an estimate of a channel response matrix for the second link; and
a matrix computation unit operative to decompose the estimated channel response matrix to obtain the plurality of steering vectors used for the first link.

26. The transmitter of claim 24, further comprising:
a channel estimator operative to obtain a channel response estimate for a plurality of spatial channels of the second link based on a steered pilot received via the plurality of spatial channels of the second link, and wherein the plurality of steering vectors used for the first link are derived based on the channel response estimate for the plurality of spatial channels of the second link.

27. A transmitter apparatus in a wireless multiple-input multiple-output (MIMO) communication system, comprising:
means for obtaining a plurality of data symbol streams for transmission on a plurality of spatial channels of a MIMO channel in the wireless MIMO communication system
means for obtaining an estimate of a plurality of steering vectors, wherein the plurality of steering vectors is based on received orthogonal pilot transmissions; and
means for performing spatial processing on the plurality of data symbol streams with the plurality of steering vectors, one steering vector for each data symbol stream, to obtain a plurality of transmit symbol streams for transmission from a plurality of transmit antennas, wherein the plurality of steering vectors are estimates of transmitter steering vectors required to orthogonalize the plurality of spatial channels, and
wherein the plurality of data symbol streams are recovered at a receiver with a spatial filter having a response derived based on a minimum mean square error (MMSE) criterion that minimizes mean square error between a plurality of filtered symbol streams from the spatial filter and the plurality of data symbol streams, $W=\hat{V}^H\hat{H}^H[\hat{H}\hat{V}\hat{V}^H\hat{H}^H+\emptyset_{nn}]^{-1}$,
where W is the spatial filter response,
$\hat{V}$ is a matrix of the steering vectors used for spatial processing at the transmitter,
$\hat{H}$ is the estimated channel response matrix,
$\hat{V}^H$ and $\hat{H}^H$ denote the Hermitian or conjugate transpose of $\hat{V}$ and $\hat{H}$ respectively, and
$\emptyset_{nn}$ is an autocovariance matrix of noise at the receiver.

28. The transmitter apparatus of claim 27, wherein the wireless MIMO communication system is a time division duplex (TDD) system, wherein the plurality of data symbol streams are transmitted on a first link of the MIMO channel, and wherein the plurality of steering vectors are derived based on an estimate of a second link of the MIMO channel.

29. The transmitter apparatus of claim 25, wherein the wireless MIMO communication system implements orthogonal frequency division multiplexing (OFDM), and wherein the spatial processing is performed for each of a plurality of subbands.

30. The method of claim 1, further comprising deriving the spatial filter response based on the estimated channel response matrix.

31. The transmitter apparatus of claim 28, further comprising:
means for receiving a steered pilot via a plurality of spatial channels of the second link; and
means for deriving the plurality of steering vectors used for the first link based on the received steered pilot.

* * * * *